(12) United States Patent
Xiong et al.

(10) Patent No.: US 10,081,111 B1
(45) Date of Patent: Sep. 25, 2018

(54) ROBOTIC HAND

(71) Applicant: UBTECH Robotics Corp., Shenzhen (CN)

(72) Inventors: Youjun Xiong, Shenzhen (CN); Yong Fu, Shenzhen (CN); Hongyu Ding, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/823,612

(22) Filed: Nov. 28, 2017

(30) Foreign Application Priority Data

Sep. 28, 2017 (CN) .......................... 2017 1 0893891

(51) Int. Cl.
*B25J 15/02* (2006.01)
*B25J 15/10* (2006.01)

(52) U.S. Cl.
CPC ....... *B25J 15/0213* (2013.01); *B25J 15/0226* (2013.01); *B25J 15/10* (2013.01)

(58) Field of Classification Search
CPC ............... B25J 15/0028; B25J 15/0213; B25J 15/0226; B25J 15/026; B25J 15/028; B25J 15/08; B25J 15/086; B25J 15/10; B25J 15/103; Y10S 901/38
USPC ................................................. 294/106, 116
See application file for complete search history.

(56) References Cited

U.S. PATENT DOCUMENTS

| | | | |
|---|---|---|---|
| 4,121,868 A * | 10/1978 | Pierce | B66C 1/66 279/37 |
| 4,598,942 A * | 7/1986 | Shum | B25J 15/103 294/106 |
| 4,600,357 A * | 7/1986 | Coules | B25J 13/082 294/106 |
| 5,378,033 A * | 1/1995 | Guo | A61F 2/583 294/115 |
| 5,884,951 A * | 3/1999 | Long | B25J 15/0206 294/106 |
| 8,474,893 B2 * | 7/2013 | Kawanami | B25J 15/0213 294/106 |
| 2005/0017529 A1* | 1/2005 | Rogers | B25J 13/085 294/103.1 |
| 2011/0089709 A1* | 4/2011 | Neeper | B25J 9/102 294/119.1 |
| 2012/0032383 A1* | 2/2012 | Li | B25J 15/0213 269/97 |
| 2017/0014197 A1* | 1/2017 | McCrea | B25J 9/104 |

* cited by examiner

*Primary Examiner* — Dean J Kramer

(57) ABSTRACT

A robotic hand includes a servo housing, a printed circuit board (PCB), a motor, a planetary gear transmission assembly and a plurality of claws rotatably connected to the servo housing. The motor is electrically connected to the PCB. An input end of the planetary gear transmission assembly is connected to an output shaft of the motor. An output end of the planetary gear transmission assembly includes a cam having a number of protruding portions in a circumferential direction thereof. Each two adjacent protruding portions are spaced apart from each other by a space, thereby forming a curved circumferential surface. One end of each of the claws stays in contact with the curved circumferential surface, enabling the claws to be rotatable toward or away from one another when driven by the cam.

10 Claims, 8 Drawing Sheets

ROBOTIC HAND

CROSS REFERENCE TO RELATED APPLICATIONS

This application claims priority to Chinese Patent Application No. 201710893891.1, filed Sep. 28, 2017, which is hereby incorporated by reference herein as if set forth in its entirety.

BACKGROUND

1. Technical Field

The present disclosure generally relates to robots, and particularly to a robotic hand.

2. Description of Related Art

The use of robotic hands in various applications is apparent today. For example, some toy mechanical hands have been designed for kids. Although conventional robotic hands can meet basic requirements, there is still a need to provide an improved one.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
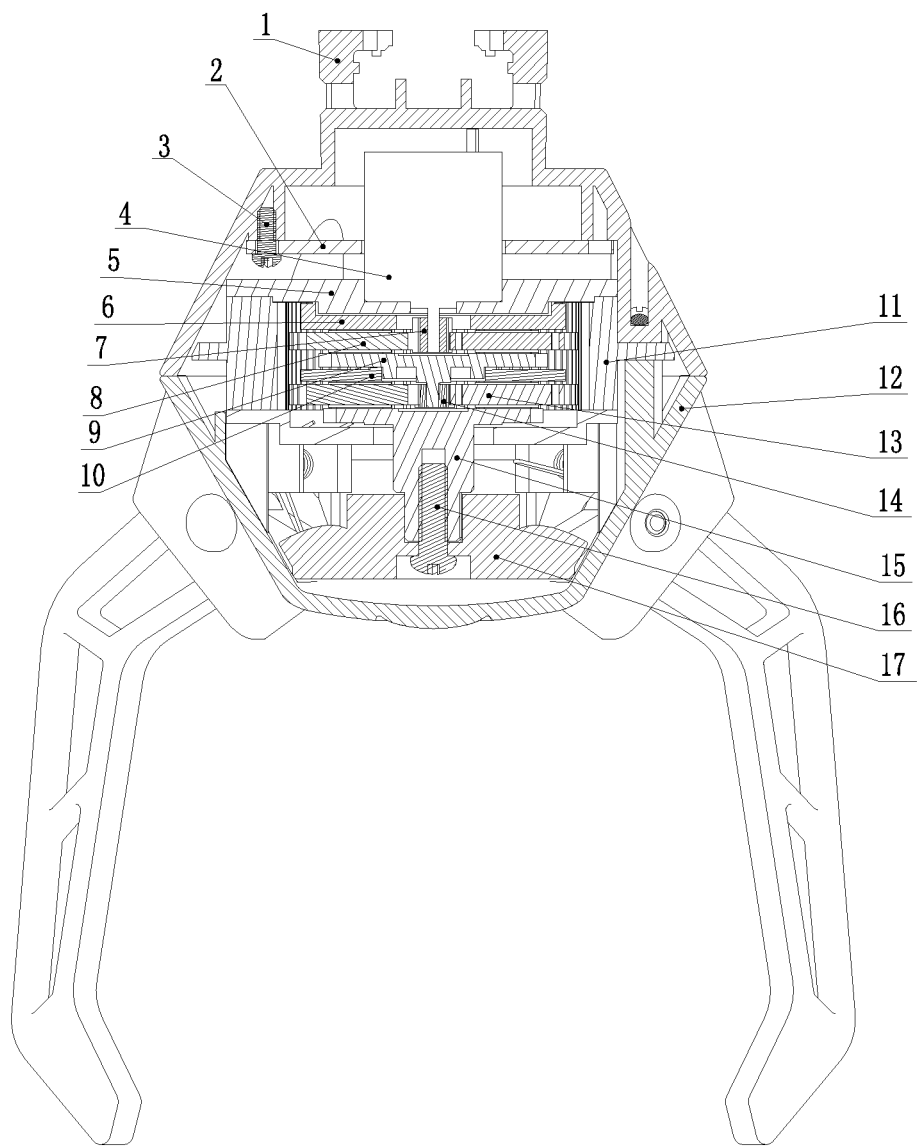
FIG. 1 is a first sectional view of a robotic hand in an open state according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
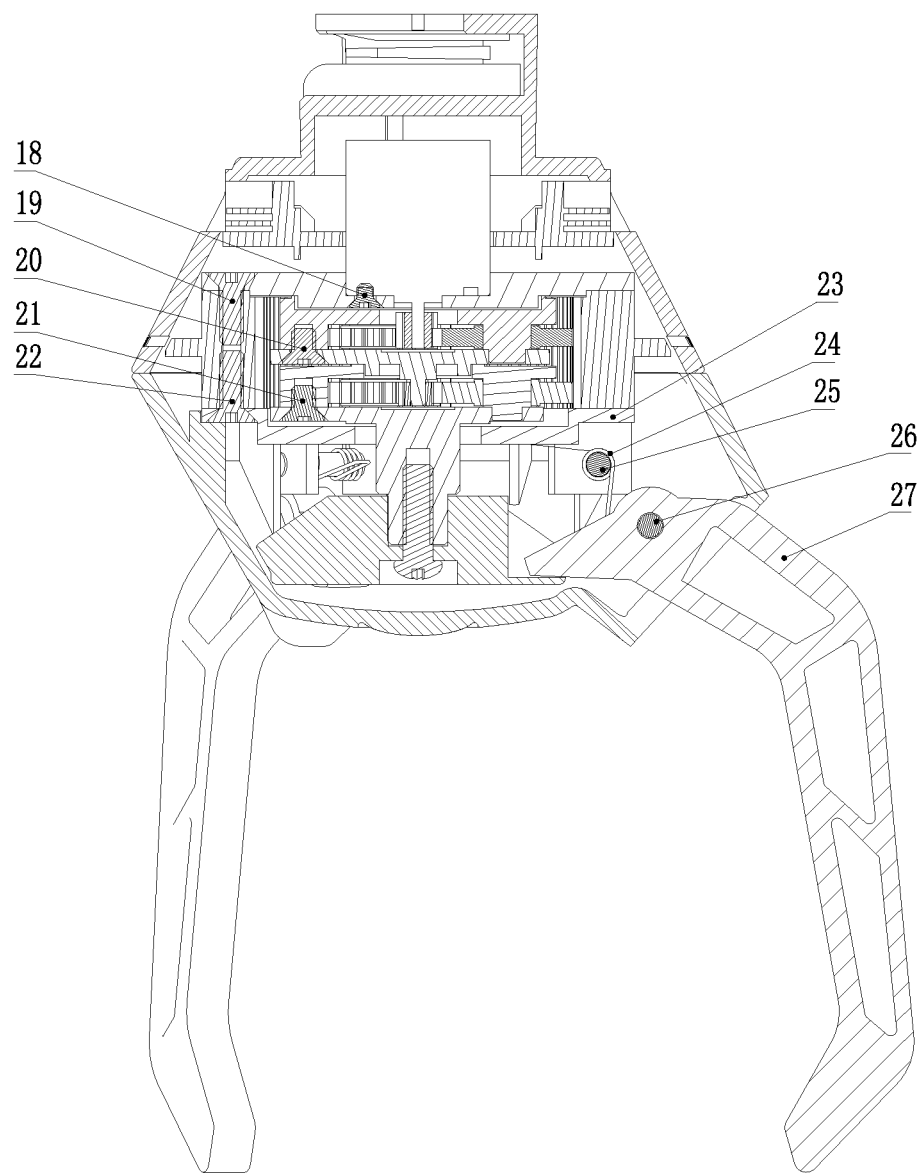
FIG. 2 is a second sectional view of the robotic hand of FIG. 1 in an open state.
Figure 3:
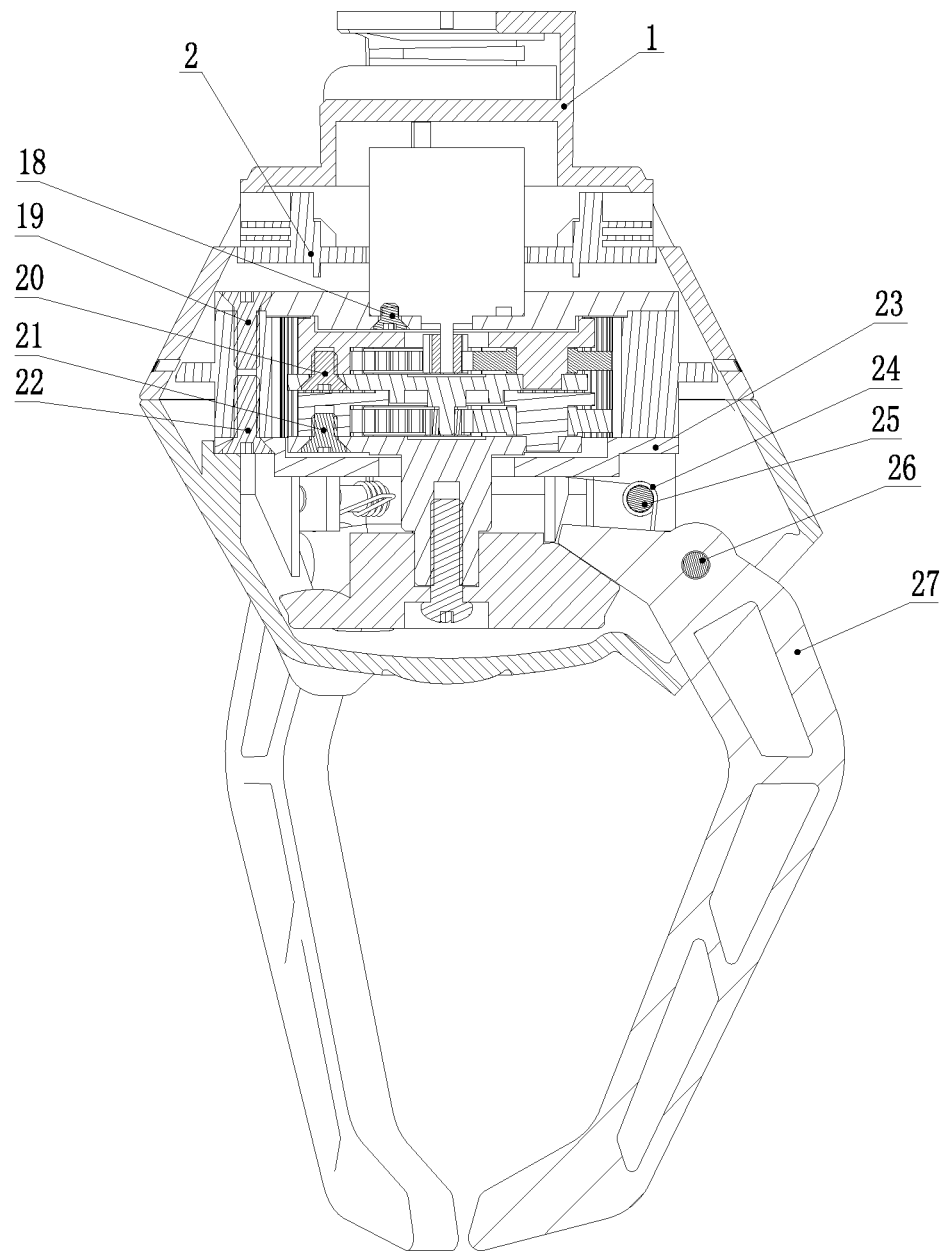
FIG. 3 is a sectional view of the robotic hand of FIG. 1 in a closed state.
Figure 4:
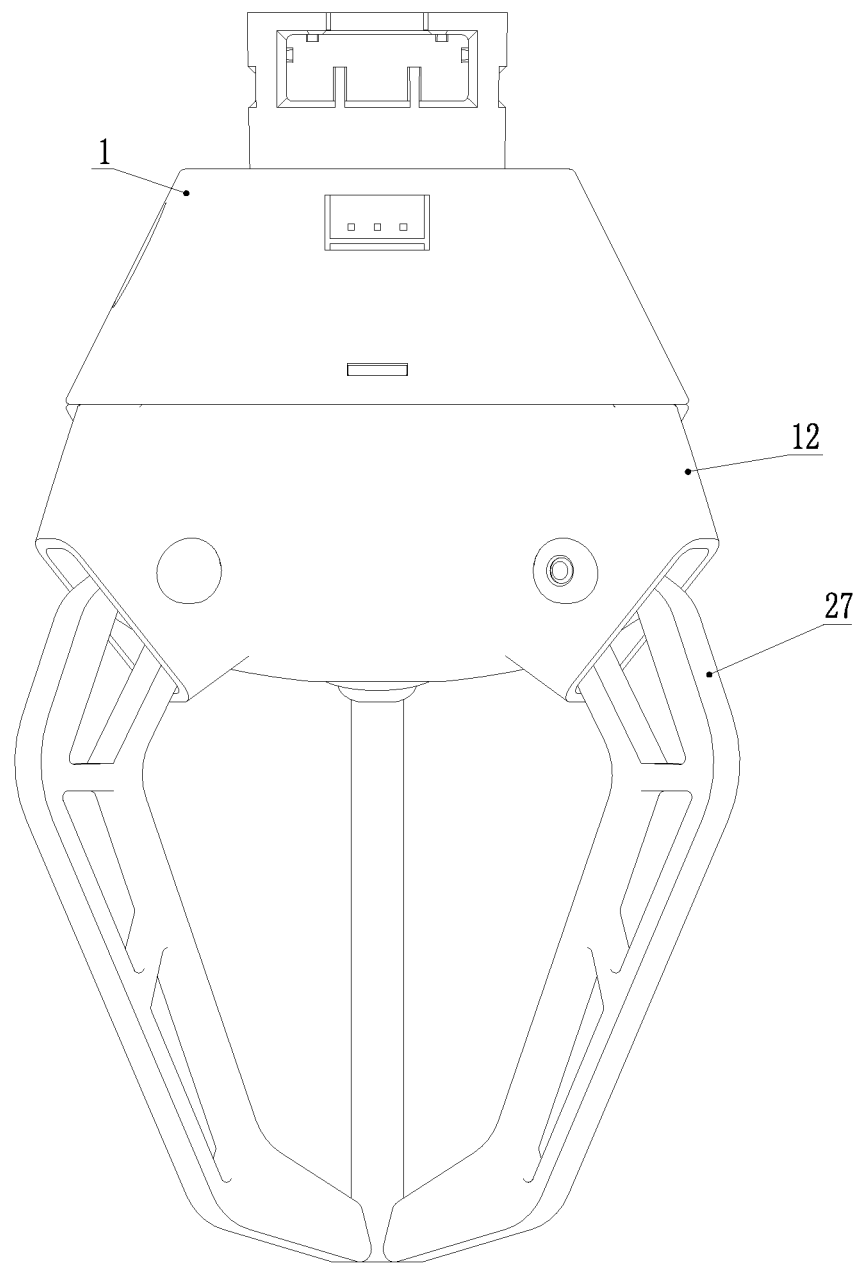
FIG. 4 is a front view of the robotic hand of FIG. 1 in a closed state.
Figure 5:
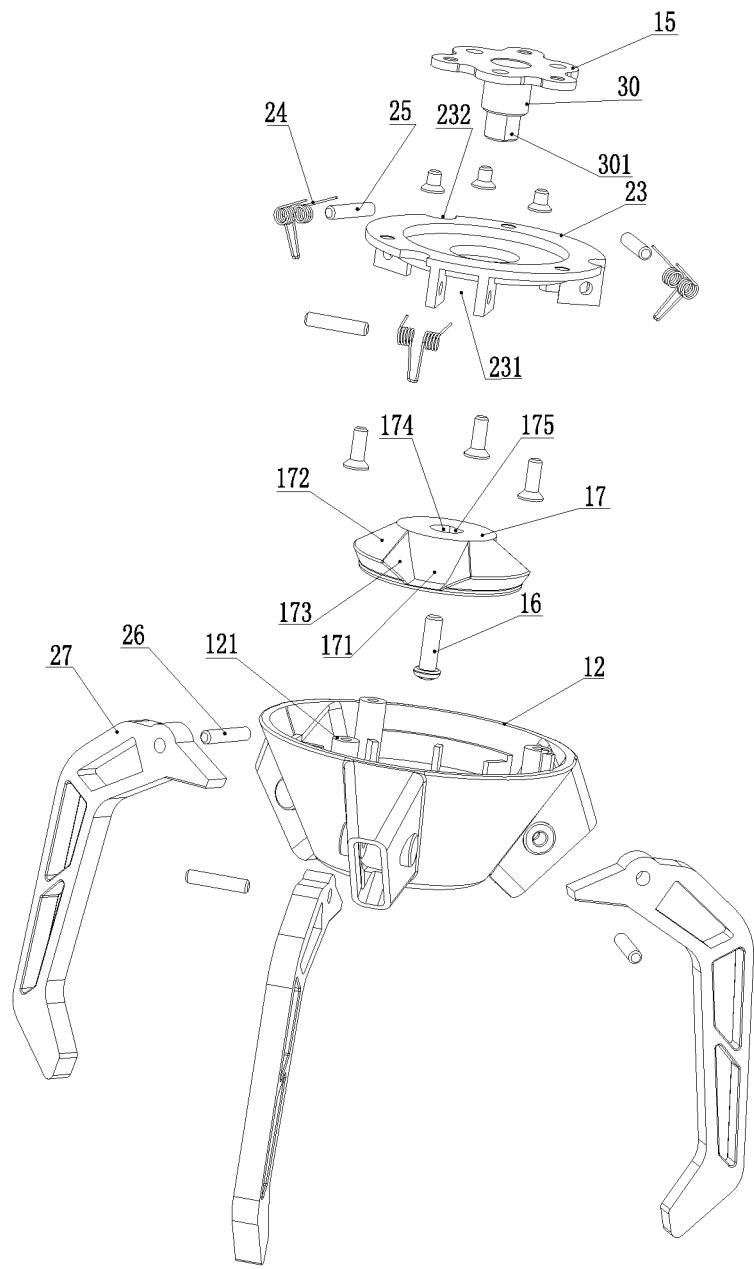
FIG. 5 is a partly exploded view of the robotic hand of FIG. 1.
Figure 6:
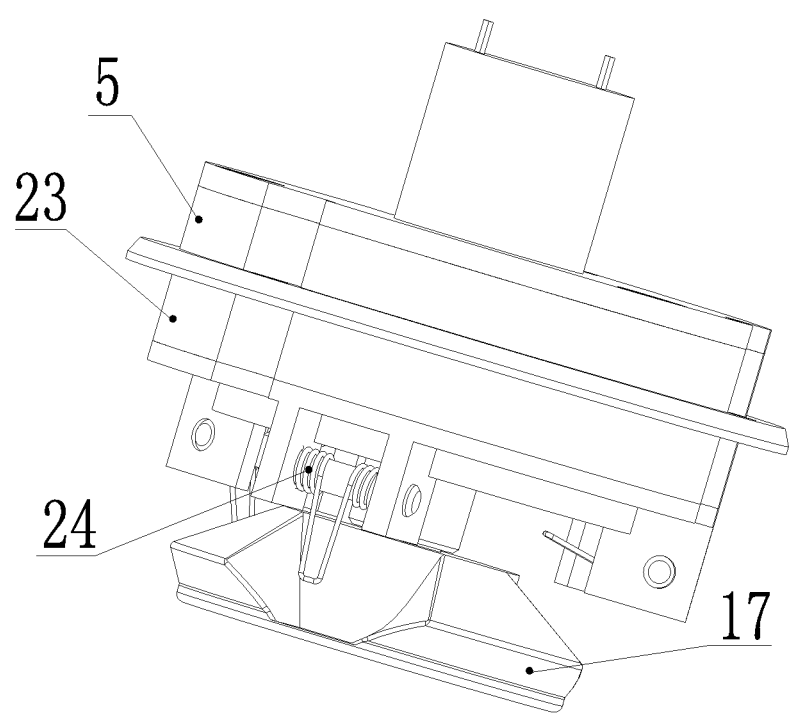
FIG. 6 is an isometric view of a portion of the robotic hand of FIG. 1.

Referring to FIGS. 1-4, in one embodiment, a robotic hand includes a servo housing, a printed circuit board (PCB) 2, a motor 4, a planetary gear transmission assembly and a number of claws 27. The present embodiment provides an example of three claws 27 in the following descriptions. It should be noted that the number of the claws 27 is not limited and can vary according to actual needs. The PCB 2, the motor 4 and the planetary gear transmission assembly are arranged, from top to bottom, in the servo housing. The motor 4 is connected to the PCB 2 and can receive instructions from the PCB 2. The input end of the planetary gear transmission assembly is connected to an output shaft of the motor 4 and can rotate when driven by the motor 4. Referring also to FIG. 5, an output end of the planetary gear transmission assembly includes a cam 17 including a plurality of protruding portions 172 in a circumferential direction thereof and each two adjacent protruding portions 172 are spaced apart from each other by a space 171, thereby forming a curved circumferential surface. In the embodiment, the number of the protruding portions 172 is three. One end of each of the claws 27 stays in contact with the curved circumferential surface, enabling the claws 27 to be rotatable toward or away from one another when driven by the cam 17. Specifically, the claws 27 are evenly arranged along a circumferential direction of the servo housing. Each claw 27 has a first end located inside the servo housing and staying in contact with the curved circumferential surface of the cam 17. Each claw 27 further includes a second opposite end that is external of the servo housing and is used to contact a to-be-grasped object. As shown in FIGS. 1 and 2, when the cam 17 rotates and causes the claws 27 to gradually move into the spaces 171, the second ends of the claws 27 move away from one another. In this case, the robotic hand opens gradually. As shown in FIGS. 3 and 4, when the cam 17 rotates and causes the claws 27 to gradually move out of the spaces 171, the second ends of the claws 27 move toward one another. In this case, the robotic hand closes gradually. With such configuration, the robotic hand can be used to grasp an object, such as a toy block. It should be understood that the number of the claws 27 can vary according to need.

The robotic hand of the embodiment can be used with building blocks. It can achieve a compact structure and meet functional requirements by using the planetary gear transmission assembly and the cam mechanism. When the PCB 2 sends an instruction to drive the motor 4 to rotate, the planetary gear transmission assembly is rotated and drives the cam 17 to rotate. The first ends of the claws 27 that stay in contact with the curved circumferential surface move as the cam rotates. The claws 27 can then rotate toward or away from one another to grasp or release an object, such as a building block.

In one embodiment, as shown in FIG. 5, each space 171 has a bottom surface and two side surfaces 173 extending from the bottom surface to top surfaces of two adjacent protruding portions 172. The top surfaces may be tapered and provide a smooth path for the first ends of the claws 27 to move between the top surfaces of the protruding portions 172 and the spaces 171. In one embodiment, the side surfaces 173 are envelope surfaces.

The output end of the planetary gear transmission assembly includes a rotation shaft 30 and the cam 17 is fixed to the rotation shaft 30. The cam 17 defines a through hole 174 that allows the rotation shaft 30 to be partly received therein. One end of the rotation shaft 30 is received in the through hole 174 and held within the through hole 174 via a first screw 16. The through hole 174 is shaped and sized to match the rotation shaft 30 in such a way that the cam 17 is rotatable together with the rotation shaft 30. For example, the lateral surface of the rotation shaft 30 includes a cylindrical surface and a flat surface connecting with the cylindrical surface 301. The through hole 174 has a cylindrical surface and a flat surface 175. With such configuration, the end of the rotation shaft 30 can be fit into the through hole 174, with the flat surfaces 301 and 175 contacting each other, which prevents the cam 17 to rotate with respect to the rotation shaft 30.

Referring to FIGS. 1-2 and 5-6, the planetary gear transmission assembly includes an upper cover 5, a lower cover 23, and a planetary gear transmission assembly of at least two stages arranged between the upper cover 5 and the lower cover 23. The planetary gear transmission assembly includes an input end connected to the motor 4 and an output end connected to rotation shaft 30. A number of urging assemblies, which are used to apply a force to the claws 27 to cause the claws 27 to stay in contact with the curved circumferential surface of cam 17, are arranged on the lower cover 23. The motor 4 is fixed to the upper cover 5 via second screws 18. Specifically, a recess is defined in the upper cover 5 and one end of the motor 4 is fit into the recess, with the output shaft of passing through an opening defined in the bottom of the recess and connecting with the planetary gear transmission assembly. In one embodiment, the urging assemblies are evenly arranged in the circumferential direction of the lower cover 23 according to the arrangement of the three claws 27.

Each of the urging assemblies includes a number of torsion springs 24 and pins 25. Each torsion spring 24 is connected to the lower cover 23 via one of the pins 25. Specifically, the lower cover 23 defines a through hole in a central area thereof and one end of the rotation shaft 30 passes through the through hole and is connected with the cam 17. The lower cover 23 includes a number of walls, two of which define a receiving space 231. In the embodiment, there are three receiving spaces 231. The urging assemblies are respectively mounted within the receiving spaces 231. Opposite ends of each pin 25 are fixed to two walls of a corresponding space, thereby fixing the pin 25 to the lower cover 23. The arms of each torsion spring 24 press against one claw 27 and the lower cover 23, thereby enabling the torsions springs 24 to apply a push force to the claws 27. The claws 27 can then stay in a constant contact with the cam 17.

Each stage of the planetary gear transmission assembly includes a sun gear, a plurality of planetary gears that are engaged with the sun gear, a gear carrier where the planetary gears are mounted, and a ring gear that is arranged around the gear carrier and is engaged with the planetary gears. The gear carrier includes a mounting panel, a plurality of shafts connected to the mounting panel, and a fixing panel fixed to the mounting panel. The planetary gears are respectively rotatably connected to the shafts, and one end of each of the shafts is received in the fixing panel.

It should be understood that the planetary gear transmission assembly may be two-staged or three-staged. A two-staged planetary gear transmission assembly is preferable considering the cost and function needed to achieve. The number of the planetary gears of each stage planetary gear mechanism is preferably three. A two-stage planetary gear transmission assembly will be described in detail as an example.

Figure 7:
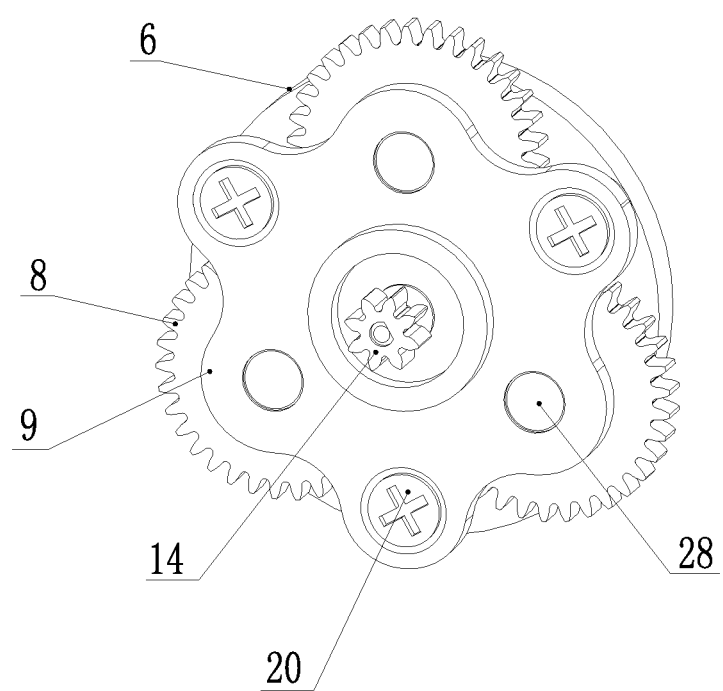
FIG. 7 is an isometric view of an assembly including a first stage planetary gear transmission mechanism and a second-stage sun gear.
Figure 8:
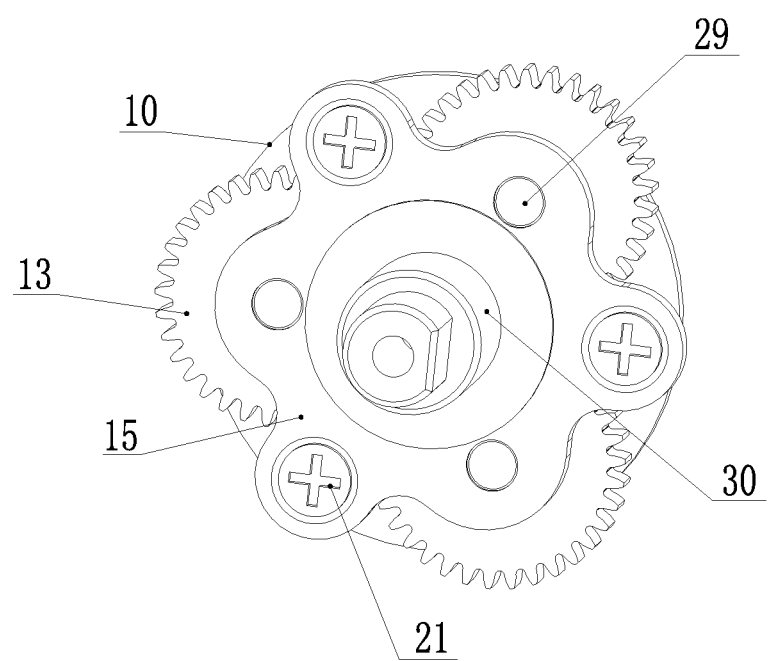
FIG. 8 is an isometric view of an assembly including a second stage planetary gear transmission mechanism and a rotation shaft.

Referring to FIGS. 7 and 8, the planetary gear transmission assembly includes a first stage planetary gear transmission mechanism and a second stage planetary gear transmission mechanism. The first stage planetary gear transmission mechanism includes a sun gear 7 that serves as an input end of the planetary gear transmission assembly and is connected to the output shaft of the motor 4, three planetary gears 8 that are engaged with the sun gear 7, a first stage gear carrier where the planetary gears 8 are mounted, and a ring gear 11 that is arranged around the first stage gear carrier and is engaged with the planetary gears 8. The first stage gear carrier includes a mounting panel 6, three shafts 28 that are connected to the mounting panel 6, and a fixing panel 9 fixed to the mounting panel 6 via the shafts 28 and serves as the output end of the first stage planetary gear transmission mechanism. The planetary gears 8 are respectively arranged around and rotatable with respect to the shafts 28. In one embodiment, one end of each of the shafts 28 is received in the fixing panel 9. The fixing panel 9 is fixed to the mounting panel 6 via third screws 20. Opposite ends of each of the shafts 28 and the third screws 20 are fixed to the fixing panel 9 and the mounting panel 6. In the embodiment, a power gear of the motor 4 may serve as the sun gear 7.

The second stage planetary gear transmission mechanism includes a sun gear 14 that serves as an input end of the second stage planetary gear transmission mechanism and is connected to the fixing panel 9, three planetary gears 13 that are engaged with the sun gear 7, a second stage gear carrier where the planetary gears 13 are mounted that serves as the output end of the planetary gear transmission assembly, and the ring gear 11 that is arranged around the second stage gear carrier and is engaged with the planetary gears 13. The second stage gear carrier includes a mounting panel 10, three shafts 29 that are connected to the mounting panel 10, and a fixing panel 15 that is fixed to the mounting panel 10 via the shafts 29 and serves as the output end of the planetary gear transmission assembly. The planetary gears 13 are respectively arranged around and rotatable with respect to the shafts 29. In one embodiment, one end of each of the shafts 29 is received in the fixing panel 15. The sun gear 14 is connected to a shaft of the fixing panel 9. The fixing panel 15 is fixed to the mounting panel 10 via fourth screws 21, and serves as the power/torque outputting member of the planetary gear transmission assembly. The rotation shaft 30 is fixed to the fixing panel 15. Opposite ends of each of the shaft 29 and the fourth screws 20 are fixed to the fixing panel 15 and the mounting panel 10.

The ring gear 11 is shared by the first stage planetary gear transmission mechanism and the second stage planetary gear transmission mechanism, which saves cost and space and facilitates the assembling/disassembling. The ring gear 11 is securely connected to the upper cover 5 through fifth screws 19, and securely connected to the lower cover 23 through sixth screws 22.

The servo housing includes an upper housing 1 and a lower housing 12 that are connected to each other. The PCB 2 is fixed to the upper housing 1 via seven screws 3. The claws 27 are rotatably connected to the lower housing 12. The upper housing 1, the ring gear 11 and the lower housing 12 are connected to one another via screws. As shown in FIG. 5, each claw 27 is rotatably connected to the lower housing 12 via a pin 26. Each claw 27 is rotatable with respect to the corresponding pin 26, while the pin 26 is fixed to the lower housing 12.

As shown in FIG. 5, in one embodiment, the lower housing 12 includes a number of guiding posts 121 therein. The guiding posts 121 are parallel to each other and are evenly arranged around the circumferential direction of the lower housing 12. The lower cover 23 defines a number of recesses 232 in the outer edge thereof that are respectively mated with the guiding posts 121. The recesses 232 prevents the lower cover 23 from rotating. In the embodiment, the recesses 232 each are U shaped. The number of the guiding posts 121 is equal to the number of the recesses 232, both of which may vary according to need.

In the embodiment, the upper housing, the lower housing and the planetary gear transmission assembly are connected to one another via screws.

The operation of the robotic hand is described as follows. The PCB 2 sends an instruction to drive the motor 4 to operate. The motor 4 then rotates the sun gear 7 which drives the planetary gears 8 to rotate. Since the three planetary gears 8 are engaged with the ring gear 11, the planetary gears 8, together with the mounting panel 6 and the fixing panel 9, revolve around the sun gear 7. Since the sun gear 14 of the second stage planetary gear transmission mechanism is fixed to the fixing panel 9, the fixing panel 9 thus not only functions as the outputting member of the first stage planetary gear transmission mechanism but also the inputting member of the second stage planetary gear transmission mechanism. Similarly, the sun gear 14 drives the planetary gears 13 to rotate. Since the planetary gears 13 are engaged with ring gear 11, the planetary gears 13, together with the mounting panel 10 and the fixing panel 15, revolve around the sun gear 14. Since the rotation shaft 30 is fixed to the fixing panel 15 and serves as the outputting shaft of the planetary gear transmission assembly, it drives the cam 17 to rotate. The claws 27 are then rotatable toward or away from one another, causing the robotic hand to open or close.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robotic hand comprising a servo housing, a printed circuit board (PCB), a motor, a planetary gear transmission assembly and a plurality of claws rotatably connected to the servo housing, wherein the motor is electrically connected to the PCB, an input end of the planetary gear transmission assembly is connected to an output shaft of the motor, an output end of the planetary gear transmission assembly comprises a cam, the cam comprises a plurality of protruding portions in a circumferential direction thereof and each two adjacent protruding portions are spaced apart from each other by a space, thereby forming a curved circumferential surface, and one end of each of the claws stays in contact with the curved circumferential surface, enabling the claws to be rotatable toward or away from one another when driven by the cam;

wherein the cam and the claws are configured such that each claw is rotatable around an axis that is perpendicular to an axis around which the cam rotates;

wherein the output end of the planetary gear transmission assembly comprises a rotation shaft, the cam defines a through hole that allows the rotation shaft to be partly received therein, the through hole is shaped and sized to match the rotation shaft in such a way that the cam is rotatable together with the rotation shaft;

wherein the planetary gear transmission assembly includes an upper cover, a lower cover and a planetary gear transmission mechanism of at least two stages arranged between the upper cover and the lower cover, the planetary gear transmission mechanism comprises an input end connected to the output shaft of the motor and an output end connected to the rotation shaft, and the lower cover comprises a plurality of urging assemblies that are configured to apply a force to the claws to cause the claws to stay in contact with the curved circumferential surface.

2. The robotic hand of claim 1, wherein the space of each two adjacent protruding portions comprises a bottom surface and two side surfaces extending from the bottom surface to top surfaces of two adjacent protruding portions.

3. The robotic hand of claim 1, wherein each of the urging assemblies comprises a plurality of torsion springs and pins, each torsion spring is connected to the lower cover via one of the pins.

4. The robotic hand of claim 1, wherein each stage of the planetary gear transmission mechanism comprises a sun gear, a plurality of planetary gears that are engaged with the sun gear, a gear carrier where the planetary gears are mounted, and a ring gear that is arranged around the gear carrier and is engaged with the planetary gears.

5. The robotic hand of claim 4, wherein the gear carrier comprises a mounting panel, a plurality of shafts connected to the mounting panel, and a fixing panel fixed to the mounting panel, the planetary gears are respectively rotatably connected to the shafts, and one end of each of the shafts is received in the fixing panel.

6. The robotic hand of claim 4, wherein the ring gear is utilized by each stage of the planetary gear transmission mechanism.

7. The robotic hand of claim 1, wherein the servo housing comprises an upper housing and a lower housing that are connected to each other, the PCB is fixed to the upper housing, and the claws are connected to the lower housing.

8. The robotic hand of claim 7, wherein the lower housing comprising therein a plurality of guiding posts, and the lower cover defines a plurality of recesses that are respectively mated with the guiding posts.

9. A robotic hand comprising a servo housing, a printed circuit board (PCB), a motor, a planetary gear transmission assembly and a plurality of claws rotatably connected to the servo housing, wherein the motor is electrically connected to the PCB, an input end of the planetary gear transmission assembly is connected to an output shaft of the motor, an output end of the planetary gear transmission assembly comprises a cam having a curved circumferential surface, and one end of each of the claws stays in contact with the curved circumferential surface, and the claws are rotatable toward or away from one another when driven by the cam;

wherein the planetary gear transmission assembly comprises an upper cover, a lower cover and a planetary gear transmission mechanism of at least two stages arranged between the upper cover and the lower cover, the planetary gear transmission mechanism comprises an input end connected to the output shaft of the motor and an output end, and the lower cover comprises a plurality of urging assemblies that are configured to apply a force to the claws to cause the claws to stay in contact with the curved circumferential surface.

10. The robotic hand of claim 9, wherein the output end of the planetary gear transmission assembly comprises a rotation shaft, the cam defines a through hole that allows the rotation shaft to be partly received therein, the through hole is shaped and sized to match the rotation shaft such that the cam is rotatable together with the rotation shaft, and the output end of the planetary gear transmission mechanism is connected to the rotation shaft.

* * * * *